RADIO FREQUENCY TUNING DEVICE

Filed March 6, 1951 2 Sheets-Sheet 1

Inventor
DONALD H. FISHER
WILLIAM JONES

By Emery, Holcombe & Blair
Attorneys

July 28, 1953 D. H. FISHER ET AL 2,646,684

RADIO FREQUENCY TUNING DEVICE

Filed March 6, 1951 2 Sheets-Sheet 2

Inventor

DONALD H FISHER

WILLIAM JONES

By Emery Holcombe & Blair

Attorneys

Patented July 28, 1953 2,646,684

UNITED STATES PATENT OFFICE 2,646,684

RADIO-FREQUENCY TUNING DEVICE

Donald Henry Fisher and William Jones, Cambridge, England, assignors to Pye Limited, Cambridge, England, a British company Application March 6, 1951, Serial No. 214,080
In Great Britain March 7, 1950

4 Claims. (Cl. 74—10.8)

The present invention relates to a tuning device of the kind in which a plurality of variable inductances or capacities have to be varied simultaneously by moving the adjusting members longitudinally with respect thereto. For example, the tuning devices may comprise inductances having axially movable magnetic cores for adjusting the tuning. The inductances may be arranged side-by-side and the cores carried by a support member movable relative to the inductances so that all the cores will be moved simultaneously to effect simultaneous adjustment of the inductance values of the coils. Difficulty is experienced in practice due to the cores not all being moved by exactly the same amount when the support member is moved, which is generally due to the support member rocking slightly with respect to its direction of movement. This drawback can be reduced by constructing the adjusting mechanism so that it acts simultaneously on both ends of the support member, but this leads to an increase in the cost of the apparatus and any backlash in either of the adjusting drives still gives rise to the same trouble.

The present invention has for one of its objects to overcome these disadvantages whilst simplifying the apparatus and thus reducing its cost. This may be achieved according to the invention by constructing the movable support member in the form of a plate or with a flat surface in which are formed two or more slots or recesses extending in the direction of movement of the support member, said slots or recesses lying opposite to slots or recesses in another plane member upon which the fixed parts of the tuning device are carried, and wherein the relative movement between the movable and fixed support members is guided by means of balls engaging in the opposed slots or recesses and so arranged that transverse rocking between the movable and fixed support members is prevented. The movable and fixed support members are held in the desired spaced relation to locate the balls therebetween and are preferably resiliently urged together.

In order that the invention may be more clearly understood, reference will now be made to the accompanying drawings, which show diagrammatically two embodiments of the invention by way of example.

Figures 1, 2:
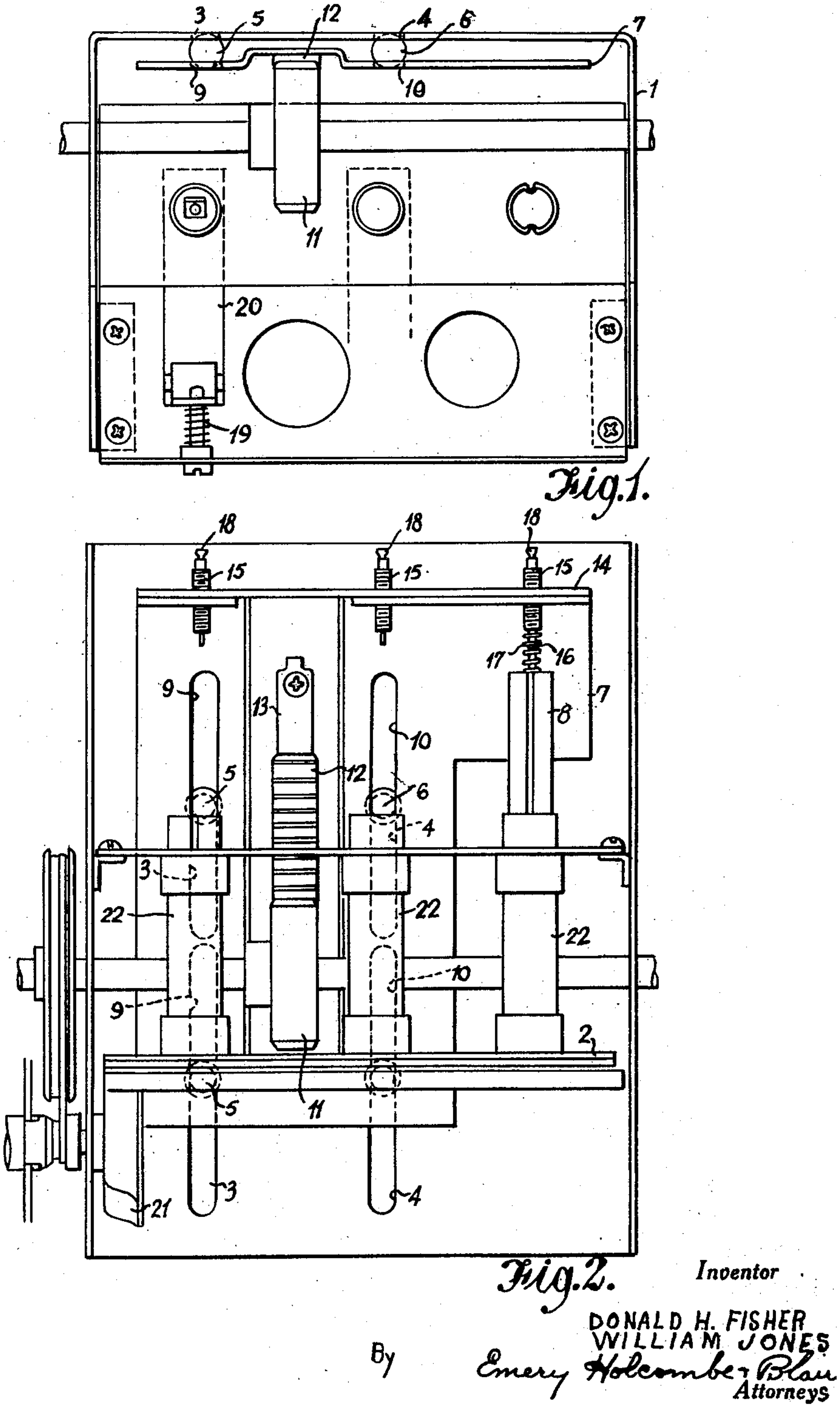
Fig. 1 is an end view of a tuning device according to the invention.
Fig. 2 is an underneath view of the tuning device shown in Fig. 1.

Referring to Figs. 1 and 2, the fixed support member 1 is made of sheet metal bent to channel form, between the limbs of which is mounted a bracket 2 for supporting two or more coils 22 with their axes extending parallel to and in the longitudinal direction of the base of the channel.

In said base are formed two spaced and longitudinally extending parallel pairs of aligned slots 3, 4 within which slots rest steel balls 5, 5 and 6, 6 respectively spaced apart in the longitudinal direction. Bearing on these four balls is a movable metal plate 7 for supporting the movable elements 8 of the tuner, said plate being formed with two parallel pairs of aligned slots 9, 10 spaced corresponding to the slots 3, 4 in the base of the channel, said slots resting on the balls. In this way, the balls are located and secured between the fixed and movable plates 1 and 7 and restrict and guide the movement of the movable plate 7 in a straight line path.

The movable plate is actuated by means of a toothed wheel 11 engaging with a toothed rack 12 carried by the movable plate. This rack is preferably made of rubber or like resilient material and is secured, for example, by an adhesive or clamping members 13, to the movable plate between the two slots therein, the pinion being so positioned that it causes, through the resilient rack, a resilient pressure to be exerted on the balls and thus ensure accurate guiding.

The movable cores 8 may be carried from a flange 14 at one end of the movable plate 7 so that they will be moved into and out of the coil formers as the plate is moved. The positions of the cores may be adjustable longitudinally of the coils by means of adjusting screws 15 carried by the flange so that correct alignment between the various circuits associated with the inductances may be attained. Preferably, these adjusting screws are of tubular form through which passes a thin wire 16 carrying the core, a spring 17 surrounding the wire and urging the core away from the screw, the end of the wire being headed at 18 to hold it in the screw. This construction prevents damage if the core should "bind" in the former as it is being moved thereinto. Means are provided, such as adjuster screw 19 and bracket 20, for transversely adjusting the positions of the inductance coils to align them with the movement of the cores.

Whilst in the embodiment described two pairs of elongated slots are provided in each of the fixed and movable members, it will be understood that the slots of each pair may be joined to form a single slot. Further, it will be understood that accurately guided alignment can be obtained with only three balls arranged at the points of a triangle and co-operating with correspondingly positioned slots or recesses in the fixed and movable members.

The fixed framework may carry the elements of a wave-change switch 21 used in conjunction with the coils.

Figure 3:
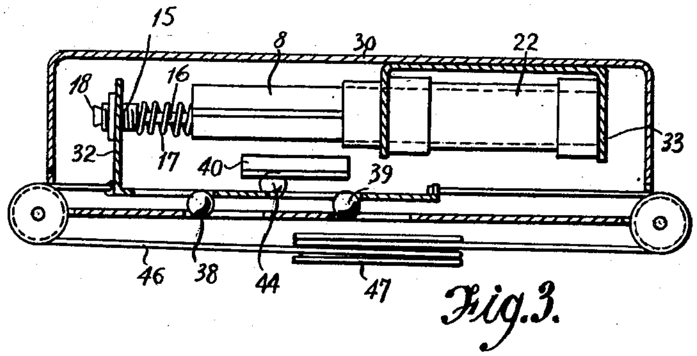
Fig. 3 is a diagrammatic side elevation of a modified form of construction of tuning device according to the invention.
Figure 4:
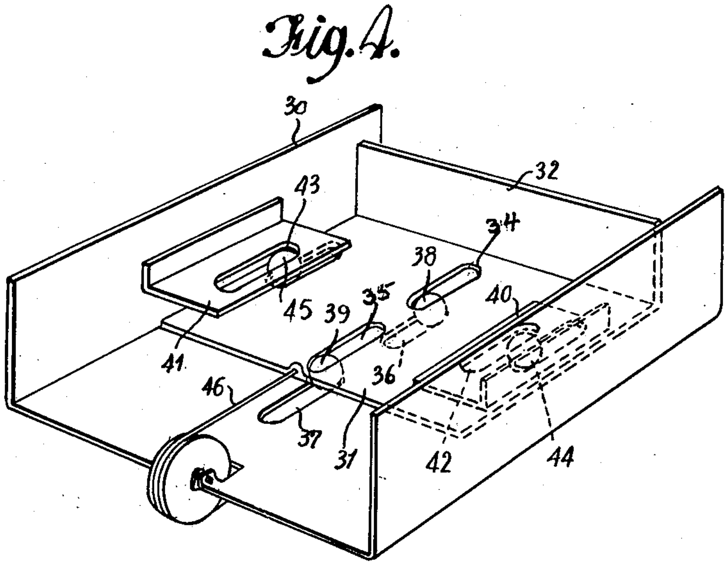
Fig. 4 is a perspective view of the tuning device shown in Fig. 3.

Figs. 3 and 4 show a modified form of construction of tuning device according to the invention which obviates the difficulty which is experienced in punching or machining three or four slots to the degree of accuracy necessary to ensure that the balls will bear equally upon all surfaces. It also obviates the difficulty caused by an inherent twist or bend in either or both of the supporting members.

Referring to Figs. 3 and 4, the fixed supporting member is in the form of a channel member 30 and the movable supporting member is in the form of a plate 31 having a flange 32 at one end carrying the cores 8 on adjusting wires 16 as in the previously described construction. The inductances 22 are shown supported on a bracket member 33.

The plate 31 is formed with a pair of aligned slots 34 and 35 and the channel member 30 is formed at its base with a cooperating pair of aligned slots 36 and 37. Balls 38 and 39 engage in the opposed slots 34, 36 and 35, 37 respectively and guide the member 31 in a straight line relative to the member 30. If desired, either pair of aligned slots may be replaced by a single slot of corresponding length.

Rocking movement of the member 31 about the axis formed by the balls 38 and 39 is prevented by two members 40 and 41 which may be of a resilient nature or may be resiliently mounted, for example on rubber blocks. These members are formed with slots 42 and 43 respectively extending in the direction of the movement of the movable member 31, and balls 44 and 45 engage in these slots and are resiliently pressed against the member 31 by the resilient members 40 and 41.

The member 31 is driven relatively to the member 30 by any convenient known drive and in the example shown it is driven by means of a cord 46 and a driving pulley 47.

What we claim is:

1. An operating mechanism for a tuning device comprising a plurality of variable reactances each including a fixed member and a member movable relative thereto in a straight line to vary the reactance, said mechanism comprising a fixed supporting member for said fixed members and means thereon for holding said fixed members side by side in parallel relation, a movable supporting member for said movable members movable in the direction of movement thereof, and means on said movable supporting member for holding said movable members parallel to each other and in co-operating relation with said fixed members, each of said supporting members having a flat surface with at least two pairs of aligned slots therein extending in the direction of movement of the movable supporting member, said surfaces being parallel to each other with each pair of aligned slots in one surface registerable with a corresponding pair of aligned slots in the other surface, a ball engaging in opposed slots, a resilient rack on the movable supporting member and a rotatable toothed wheel carried on the fixed supporting member and engaging said resilient rack to move the movable supporting member relative to the fixed supporting member and to resiliently urge the movable supporting member towards the fixed supporting member.

2. Mechanism as claimed in claim 1, in which the resilient rack is formed from resilient material.

3. An operating mechanism for a tuning device comprising a plurality of variable reactances each including a fixed member and a member movable relative thereto in a straight line to vary the reactance, said mechanism comprising a fixed supporting member for said fixed members and means thereon for holding said fixed members side by side in parallel relation, a movable supporting member for said movable members movable in the direction of movement thereof, and means on said movable supporting member for holding said movable members parallel to each other and in co-operating relation with said fixed members, one of said supporting members having a flat surface with at least one pair of aligned slots therein extending in the direction of movement of the movable supporting member and the other supporting member having a flat surface parallel to said first-mentioned flat surface, a ball engaging in each slot in said first-mentioned flat surface and in a slot in said second-mentioned surface, and means on opposite sides of said pair of aligned slots for resiliently urging said first-mentioned supporting member towards said second-mentioned supporting member.

4. Mechanism as claimed in claim 3, wherein said resilient urging means comprises a resilient member carried by the fixed supporting member and having a slot therein extending in the direction of movement of the movable supporting member, and a ball engaging in said slot and maintained in contact with said movable supporting member by said resilient member.

DONALD HENRY FISHER.
WILLIAM JONES.

References Cited in the file of this patent

UNITED STATES PATENTS

| Number | Name | Date |
|---|---|---|
| 2,286,283 | Kirk | June 16, 1942 |
| 2,318,572 | Cramer | May 4, 1943 |
| 2,448,296 | Cary | Aug. 31, 1948 |
| 2,563,664 | Teaf et al. | Aug. 7, 1951 |